United States Patent
Ohnstein et al.

[19]

[11] Patent Number: 5,929,542
[45] Date of Patent: *Jul. 27, 1999

[54] MICROMECHANICAL STEPPER MOTOR

[75] Inventors: Thomas R. Ohnstein, Roseville; J. David Zook, Minneapolis; James B. Starr, St. Paul, all of Minn.

[73] Assignee: Honeywell Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/794,580

[22] Filed: Feb. 3, 1997

[51] Int. Cl.$^6$ .................................................. H02K 15/00
[52] U.S. Cl. ................................. 310/40 MM; 310/49 R; 310/DIG. 6
[58] Field of Search ............................... 310/40 MM, 12, 310/49 R, DIG. 6; 348/342; 359/578

[56] References Cited

U.S. PATENT DOCUMENTS

| | | | |
|---|---|---|---|
| 5,054,522 | 10/1991 | Kowantz et al. | 137/652.33 |
| 5,189,777 | 3/1993 | Guckel et al. | 29/424 |
| 5,190,637 | 3/1993 | Guckel | 205/118 |
| 5,206,983 | 5/1993 | Guckel et al. | 29/598 |
| 5,214,747 | 5/1993 | Carr et al. | 385/22 |
| 5,327,033 | 7/1994 | Guckel et al. | 310/40 MM |
| 5,353,656 | 10/1994 | Hawkey et al. | 74/5.41 |
| 5,378,583 | 1/1995 | Guckel et al. | 430/325 |
| 5,412,265 | 5/1995 | Sickafus | 310/40 MM |
| 5,428,259 | 6/1995 | Suzuki et al. | 310/309 |
| 5,459,602 | 10/1995 | Sampsell | 359/234 |
| 5,483,387 | 1/1996 | Bauhahn et al. | 359/885 |
| 5,496,668 | 3/1996 | Guckel et al. | 430/9 |
| 5,644,177 | 7/1997 | Gucket et al. | 310/40 MM |

OTHER PUBLICATIONS

B.Bollee, "Electrostatic Motors", Philips Technical Review, vol. 30, pp. 178–194, 1969.

Martin Lim, Professor R.T.Howe, Professor R. Horowitz, "Design and Fabrication of a Linear Micromotor", Berkeley Sensor & Actuator Center Industrial Advisroy Board Meeting, Sep. 22–23, 1988.

W.S.N. Trimmer, K.J.Gabriel, "Design Considerations for a Practical Electrostatic Micro–Motor", Sensors and Actuators, 11 (1987) 189–206.

Dr.Thomas Ohnstein, Dr.David Zook, Professor Henry Guckel, "LIGA–Based tunable Optical Filters for Multispectral IR Imagers and Gas Analyzers", Semi–Annual Technical Report: Jan. 1996, submitted Feb. 2, 1996.

Benjamin C. Kuo of the University of Illinois at Urbana–Champaign, book entitled "Theory and Applications of Step Motors", pp. 39–80, pp. 316–326.

(List continued on next page.)

*Primary Examiner*—Nestor Ramirez
*Assistant Examiner*—B. Mullins
*Attorney, Agent, or Firm*—Ian D. MacKinnon

[57] ABSTRACT

A micromachined stepper motor having a toothed slider connected at either end to spring flexures. At least one of the spring flexures is positioned between a load, such as a high pass optical filter, and the slider. The slider is positioned within three stators that are sequentially energized such that they move the slider along its longitudinal axis. The springs and guide posts hold the slider in place and establish a rest position when no driving force is applied.

54 Claims, 10 Drawing Sheets

OTHER PUBLICATIONS

David P. Siddons, Erik D. Johnson, Henry Guckel, Jonathan L. Klein, U.S. Application No. 08/405,662, filed Mar. 15, 1995, "Method and Apparatus for Micromachining Using Hard X–rays".

Ohnstein et al., "A MEMS–Based Tunable Infrared Filter for Spectroscopy," Digest IEEE/LEOS 1996 Summer Topical Meetings Advances, pp. 21–22, Aug. 7, 1996.

Cox et al., "Optical Performance of High Aspect LIGA Gratings," Proceedings of the SPIE–The International Society for Optical Engineering (Feb. 7, 1995) vol. 2383, pp. 17–24.

Guckel et al., "Electromagnetic Linear Actuators with Inductive Position Sensing," Sensor and Actuators A 53: Physical, pp. 386–391, Jun. 25, 1995.

Guckel et al., "Electromagnetic Linear Actuators with Inductive Position Sensing for Micro Relay, Micro Valve and Precision Positioning Applications," 8th International Conf. on Solid State Sensors and Actuators and Eurosensors IX, Digest of Technical Pap, Jun. 25, 1995.

Christenson et al., "Micromechanics: an Emerging Technology," 1994 IEEE International SOI Conf. Proceedings, pp. 3–5, Oct. 3, 1994.

MICROMECHANICAL STEPPER MOTOR

BACKGROUND OF THE INVENTION

This invention relates generally to the field of micromechanical motors and more specifically to micro-machined linear stepper motors.

U.S. Pat. No. 5,483,387 issued to Bauhahn, et al and hereby incorporated by reference discloses a high pass optical filter. The high pass optical filter disclosed in the '387 patent utilizes a simple magnetic slider and a single electromagnetic stator to tune the high pass optical filter. The actuator however, is difficult to control and does not provide sufficient force or displacement.

A number of electric motors have been disclosed in the large scale form including rotary stepping motors. There is extensive literature on the design, performance and control of variable reluctance or switched reluctance stepping motors. Most of the literature relates to rotary steppers but the operating principles of linear steppers is the same. The operation can be understood and is described further in the description of the preferred embodiment utilizing FIGS. 7 and 8. Applicants invention incorporates a multi-pole variable reluctance linear stepping motor to improve the operation of the high pass optical filter disclosed in the '387. The stepping motor provides additional displacement and discrete displacement thereby improving the precision of the high pass filter.

For further reference, see Semi-Annual Technical Reports "LIGA-Based Tuneable Optical Filters for Multispectral IR Imagers and Gas Analyzers", by Ohnstein et al., submitted Feb. 2, 1996.

SUMMARY OF THE INVENTION

In the first generation of actuator designs disclosed in the '387 patent an integrated coil structure for the magnetic drive circuit was utilized. An example of one of these devices is shown in FIG. 1. The actuator consisted of an electromagnet with a gap in the core and a keeper or plunger which is pulled into the gap by the electromagnet. The circuit has a soft magnetic core (78% Ni to 22% Fe electroplated permalloy) with a 20 turn coil. These actuators were made with structural heights typically from 100 to 150 $\mu$m. The keeper or plunger is constrained by a folding beam spring structure with spring constant on the order of 1 to 4 N/m. This is an assembled device with the suspended spring a plunger structure mounted on four mounting posts on the actuator substrate. This type of device has two negative attributes. First the actuator consumed too much area which increases costs. Secondly, the power dissipation was high because the number of turns for this coil construction technique was small.

In second generation designs of the linear actuators these two difficulties are addressed by fabricating external coils on a LIGA-produced permalloy mandrel which is assembled onto the actuator substrate. The permalloy mandrel is roughly 3 mm long at the coil position. 25 $\mu$m diameter magnet wire was used to produce coils with up to 1000 turns. The coil preform has the shape of a staple. The two legs are furnished with springs to facilitate rigid, low magnetic loss mounting into the two pole pieces which are located on the substrate. This produces a vertical magnet structure which greatly reduces the chip area.

Applicants' invention is the use of a three phase stepper motor. There are three sets of pole pieces for a three phase stepper motor each similar to the single pole drive. Drive coil are mounted in the holes of each pole piece to complete the drive circuits. Each of the pole pieces has 10 small teeth on the leading edges. The width of the teeth is 30 $\mu$m and the space between is 45 $\mu$m for a period of 75 $\mu$m. There is a 5 $\mu$m overlap between the teeth of the stators and the slider. These dimensions determine the size of each step of the motor up to six steps per period are possible by activating multiple pole pieces.

The three phases of the motor are activated sequentially to pull the drive beam between the pole pieces. The beam can be driven in either direction by the proper sequencing of the pole pieces and this has been demonstrated.

The stepper motor has other advantages over a single phase motor for position control of the IR filter. The single phase motor is essentially an analog positioner. The position and travel is determined by the coil drive circuit. The stepper motor has a predetermined step size, so it is easier to move a preprogramed number of steps to a desired position for the filter.

Further, applicants have incorporated the use of compliant springs and guide posts to hold the slider in place and to establish its rest position when no driving force is applied.

Through the use of the stepper motor, the compliant springs and the guide posts applicant has increased the range of motion and the accuracy of the high pass optical filter of the '387 patent.

DESCRIPTION OF THE PREFERRED EMBODIMENT

Figure 1:
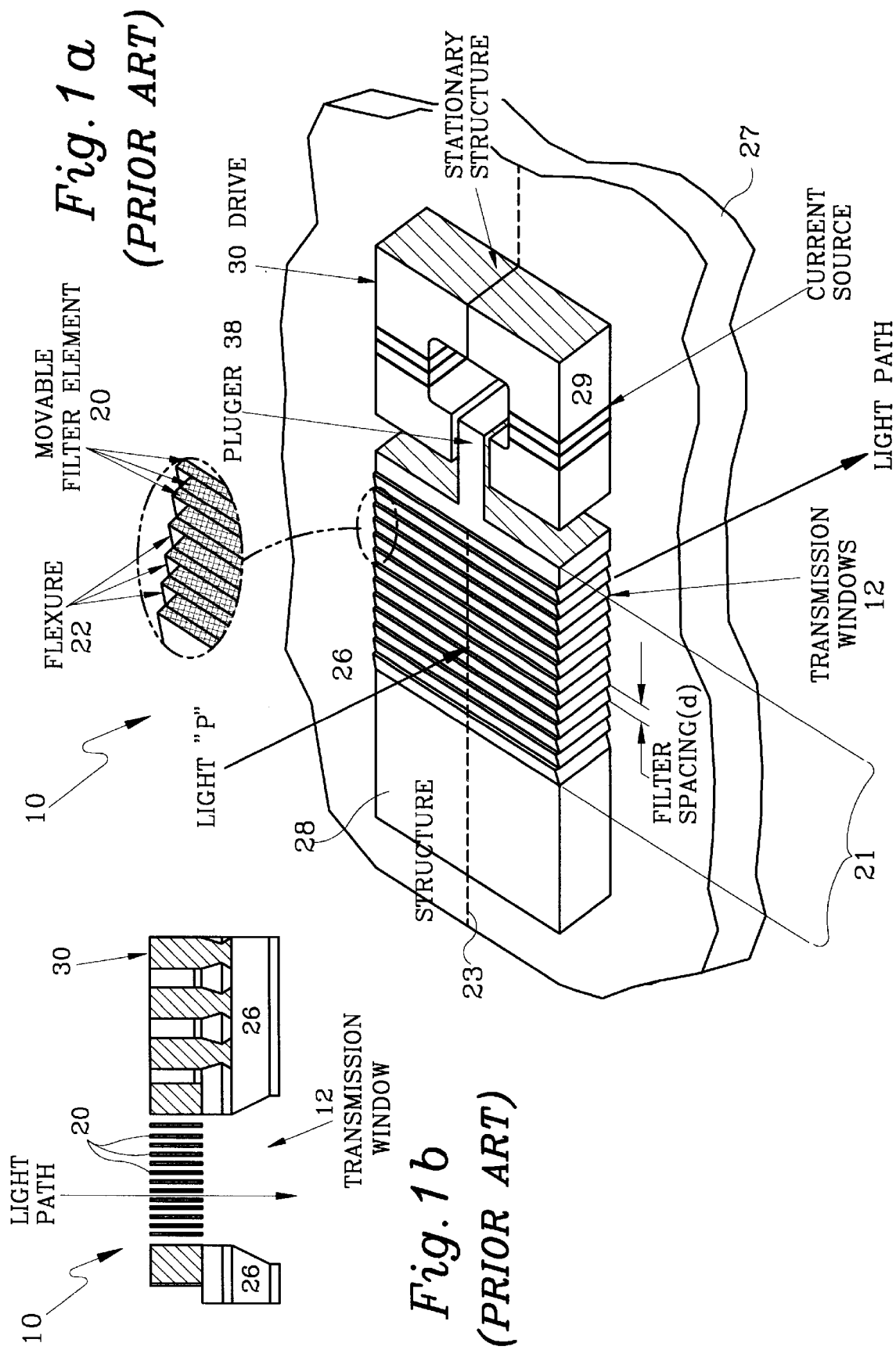
FIGS. 1a & 1b illustrates the prior art high pass optical filter of U.S. Pat. No. 5,483,387.

FIGS. 1a and 1b illustrate the high pass optical filter disclosed in the '387 patent. The method of fabricating the microstructures of present invention and that disclosed in the '387 patent is called the LIGA process, a basic process diagram appears in FIG. 12 of the '387 patent. LIGA is a German acronym for "Lithograpi Galvanoformung Abformung" and is an example of a micro-fabrication technique that lends itself to fabricating vertical metallic parallel plate arrays with extremely well defined spacing between each plate. The LIGA process is well documented and well known to those skilled in the art of micro-mechanical designs and manufactures.

Structure 10 comprises filter plates 20 flexures 22 and a plunger 38. The array 21 of parallel metal plates 20 are connected at two sides by thin metal flexures 22. Parallel plates array 21 is attached at one end to a first support structure 28 which is fixed to the substrate 26. The other end of the filter is attached to the second support structure 29 which in FIG. 1 comprises part of the linear magnetic drive 30. The filter plates 20 flexures 22 and plunger 38 of the structure 10 are free to move along the longitudinal axis, shown as dotted line 23. A sacrificial layer which is patterned under the filter structure during processing and removed at the end of the processing, releases the filter and the moveable plunger portion 38 of the structure 10 from substrate 26. The freely moveable portions 38 of the filter structure are held by side springs (not shown) that prevent the freely moveable portions 38 from dropping down and sliding along the substrate surface. The depth of the filter structure, allowed by the LIGA process, provides flexural stiffness that prevents the filter array 21 from sagging. The moveable end 38 of the filter is suspended above the substrate 26 by the second support structure 29 as part of the linear drive 30. All the parts of the structure 10 can be fabricated in place at the same time. Further detail with respect to FIG. 1 and for that matter the prior art high pass optical filter can be found in U.S. Pat. No. 5,483,387 and as stated earlier is hereby incorporated by reference.

Figure 2:
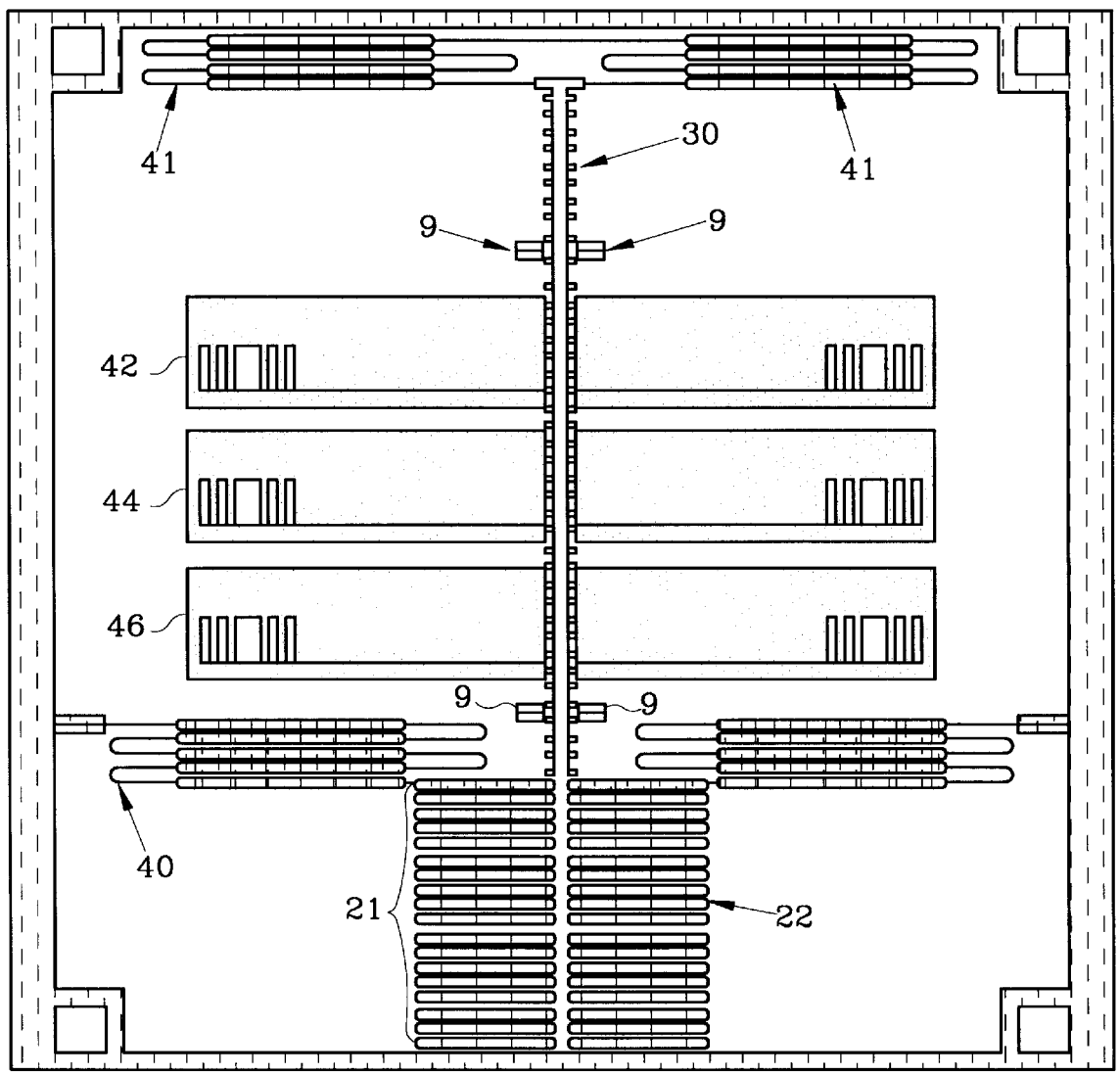
FIG. 2 illustrates a top down view of the three phase stepping motor.

FIG. 2 illustrates applicant's improvement upon the earlier high pass optical filter which incorporates a three phase stepper motor to replace plunger 38 and drive 30. Design of the improved filter structure incorporates flexures 22, filter array 21, support spring flexures 40 and 41, stators 42, 44 and 46 and plunger 30. Support spring flexures 41 are connected to one end of plunger 30 while the opposite end of plunger 30 is connected to support spring flexures 40 which is connected to filter array 21. Guide posts 9 operate to keep plunger 30 aligned between stators 42, 44 and 46.

Figure 10:
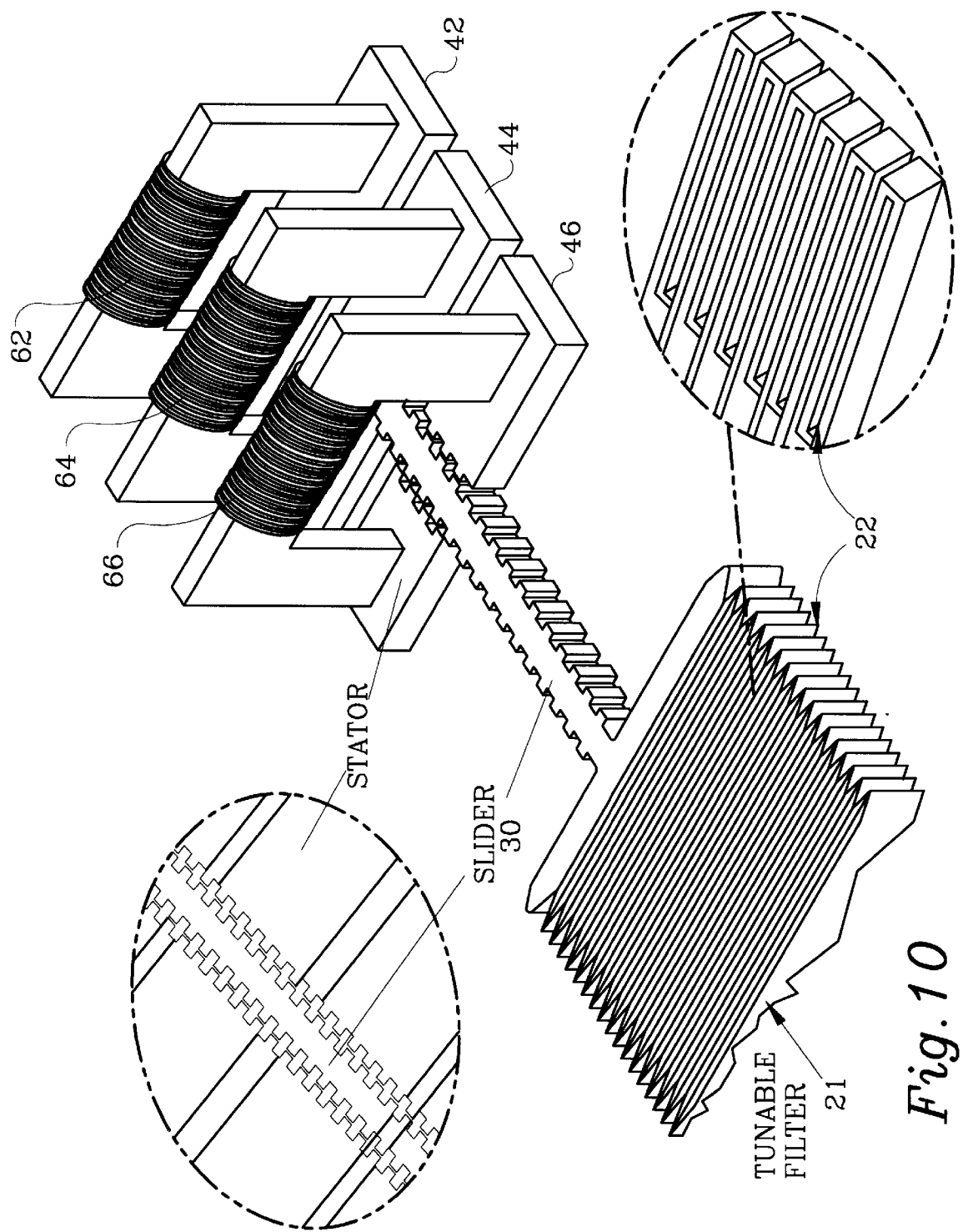
FIG. 10 illustrates a three dimensional view of applicants invention.

FIG. 10 illustrates a three dimensional view of the stepper motor. As illustrated in FIG. 10 each of the stators 42, 44, and 46, has a corresponding electrical coil, 62, 64, and 66. Electrical parameters for the coils are: 50 ohms per 500 turns and inductance from 0.2 to 1 milliHenry. The inductances remain constant for frequencies up to 150 kHz. Higher frequencies show skin effect problems. Maximum DC-currents are set by temperature considerations which cause magnet wire insulation failures. The coils which typically result in 50 Ohm resistance in series with up to 3 milliHenry inductance produce flux saturation at a few milliamperes. This reduces the required current drive and the power dissipation. Resonant displacements of 300 microns can be obtained with a drive current of 1 mA and power dissipation less than 200 $\mu$W. DC-power consumption for DC-displacement has been reduced to less than 10 milliwatt with mmf production of 50 ampere-turns and a maximum current requirement of 20 mA. This is all a consequence of the development of the coil technology and assembly method made possible by the LIGA process.

Figure 3:
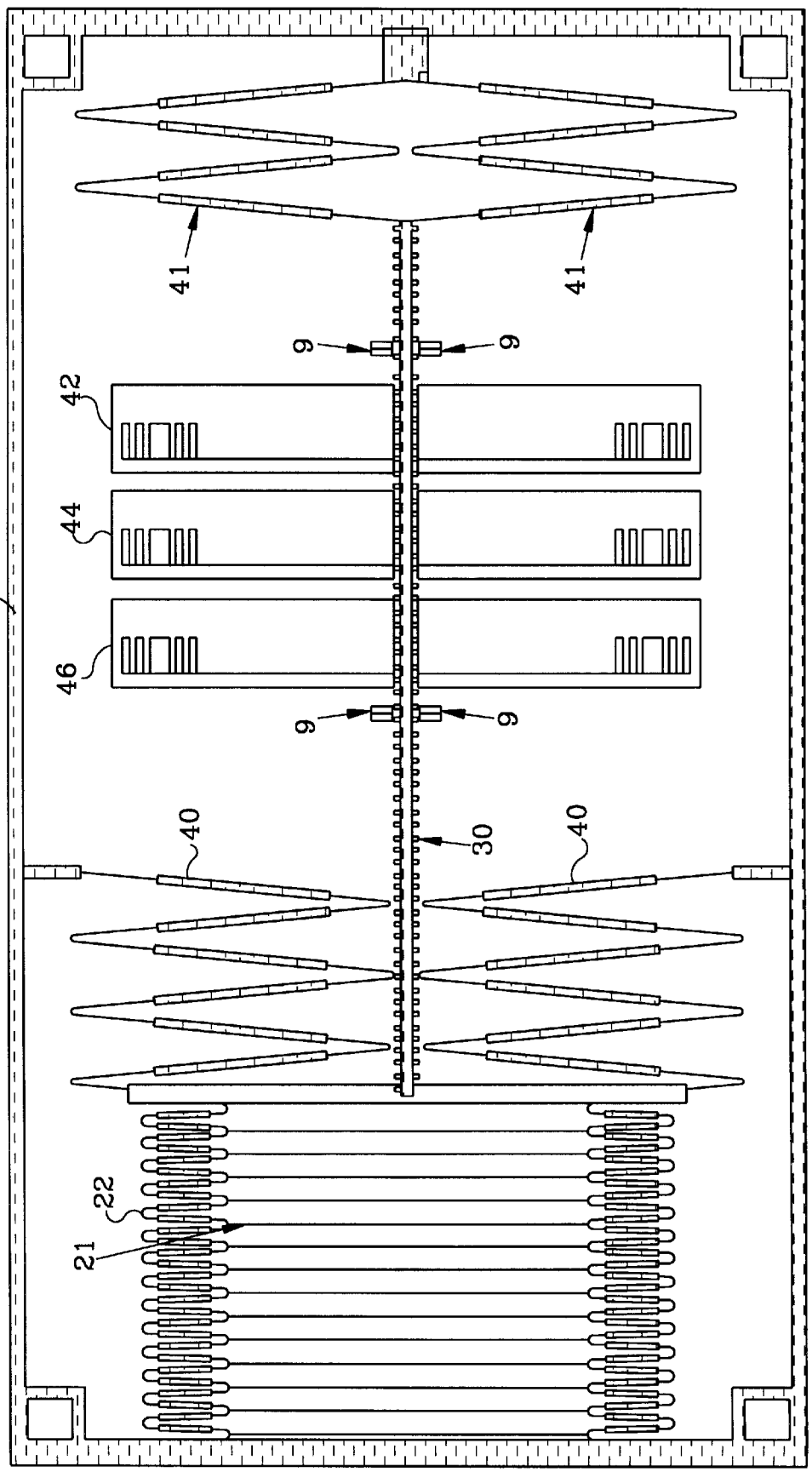
FIG. 3 illustrates a second diagram illustrating the three phase stepping motor.

FIG. 3 illustrates a second embodiment of applicant's invention utilizing the same descriptors as those of FIG. 2.

Figure 4:
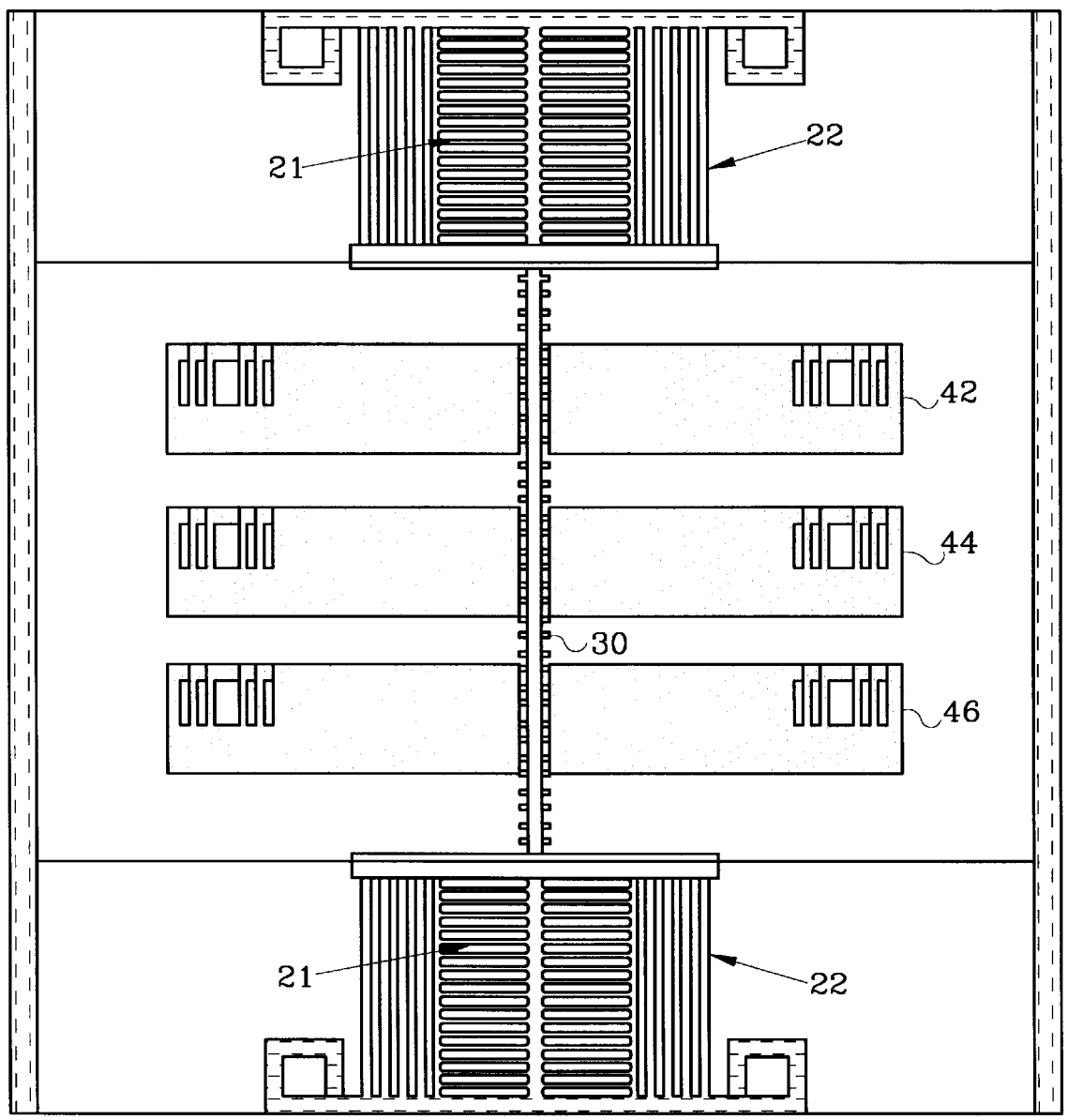
FIG. 4 illustrates another view of the three phase stepping motor.

FIG. 4 illustrates a third embodiment of applicant's invention wherein instead of a separate spring flexure 41 being utilized to support the far end of plunger 30 a second high pass optical array is utilized at either end of plunger 30.

Figure 5:
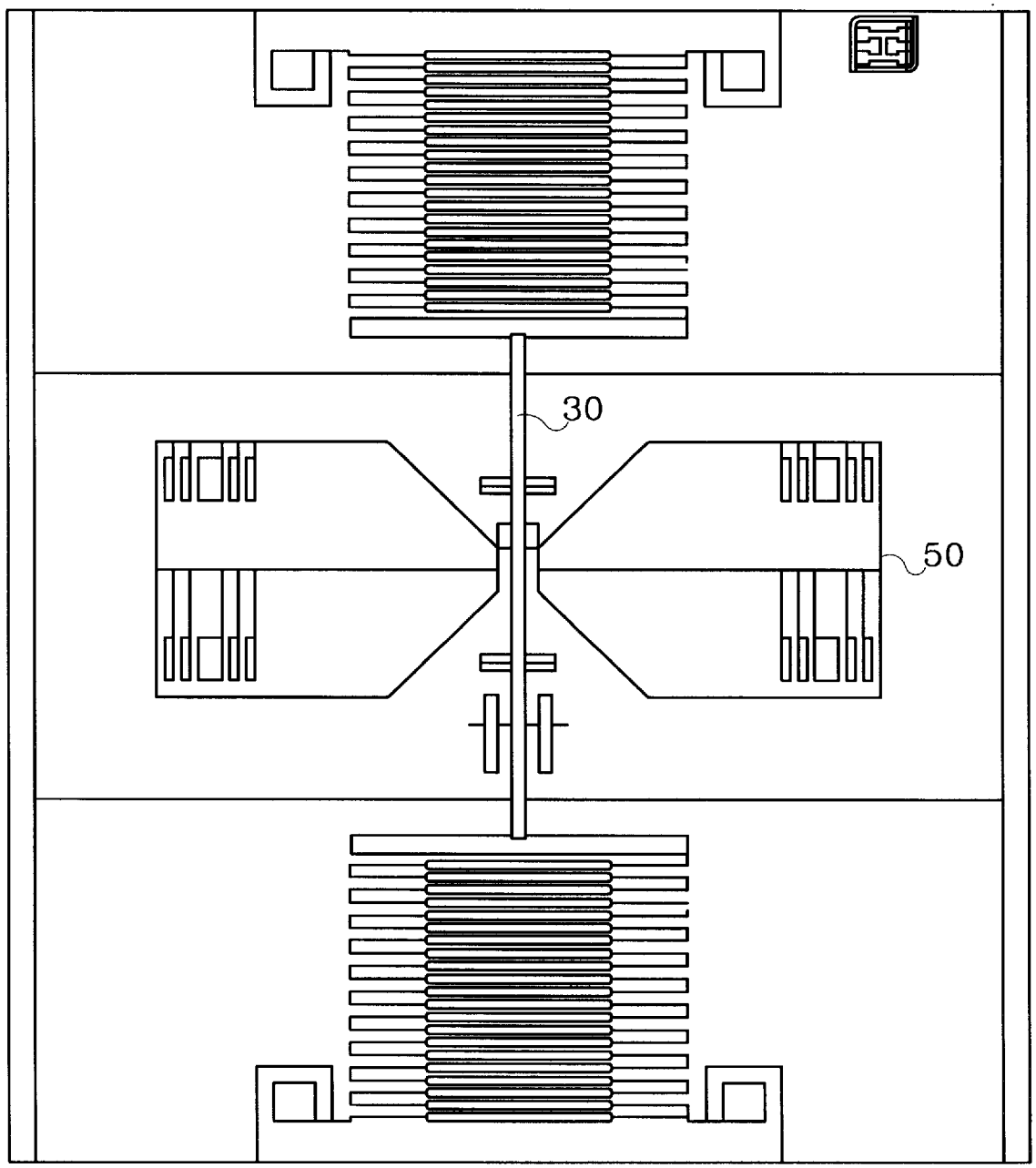
FIG. 5 illustrates an earlier design of a linear motor.

FIG. 5 illustrates an earlier design of a a plunger array with a single winding 50 utilized to provide movement of plunger 30. This earlier design does not include a stepper motor and is incorporated only for reference purposes.

Figure 6:
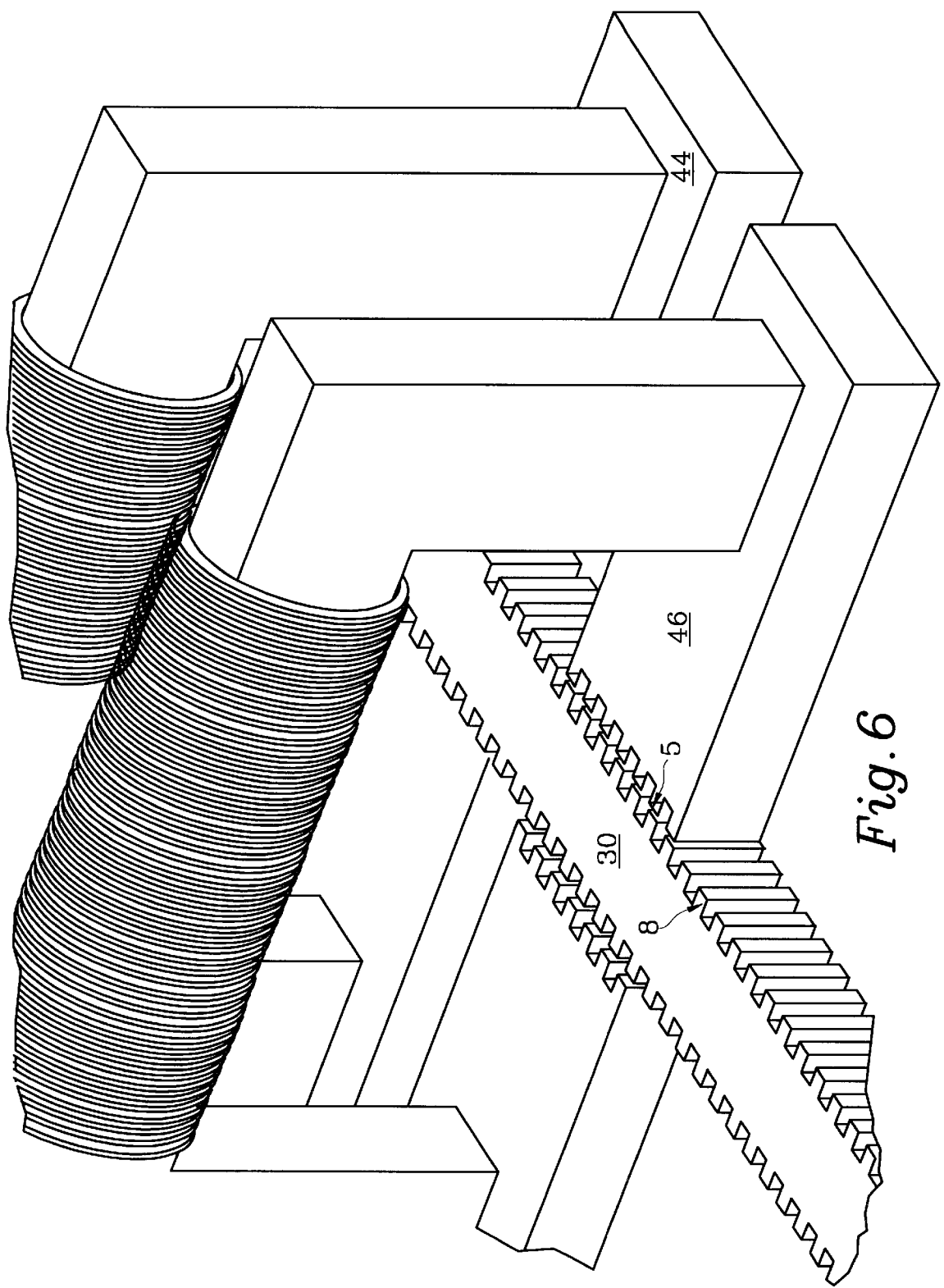
FIG. 6 illustrates a blown-up view of the alignment of the stator with one section of the three phase stepping motor.

FIG. 6 illustrates a close up view of the stepper motor showing slider 30 with teeth 8, stator 46 with teeth 5 and coil 66.

Figure 7:
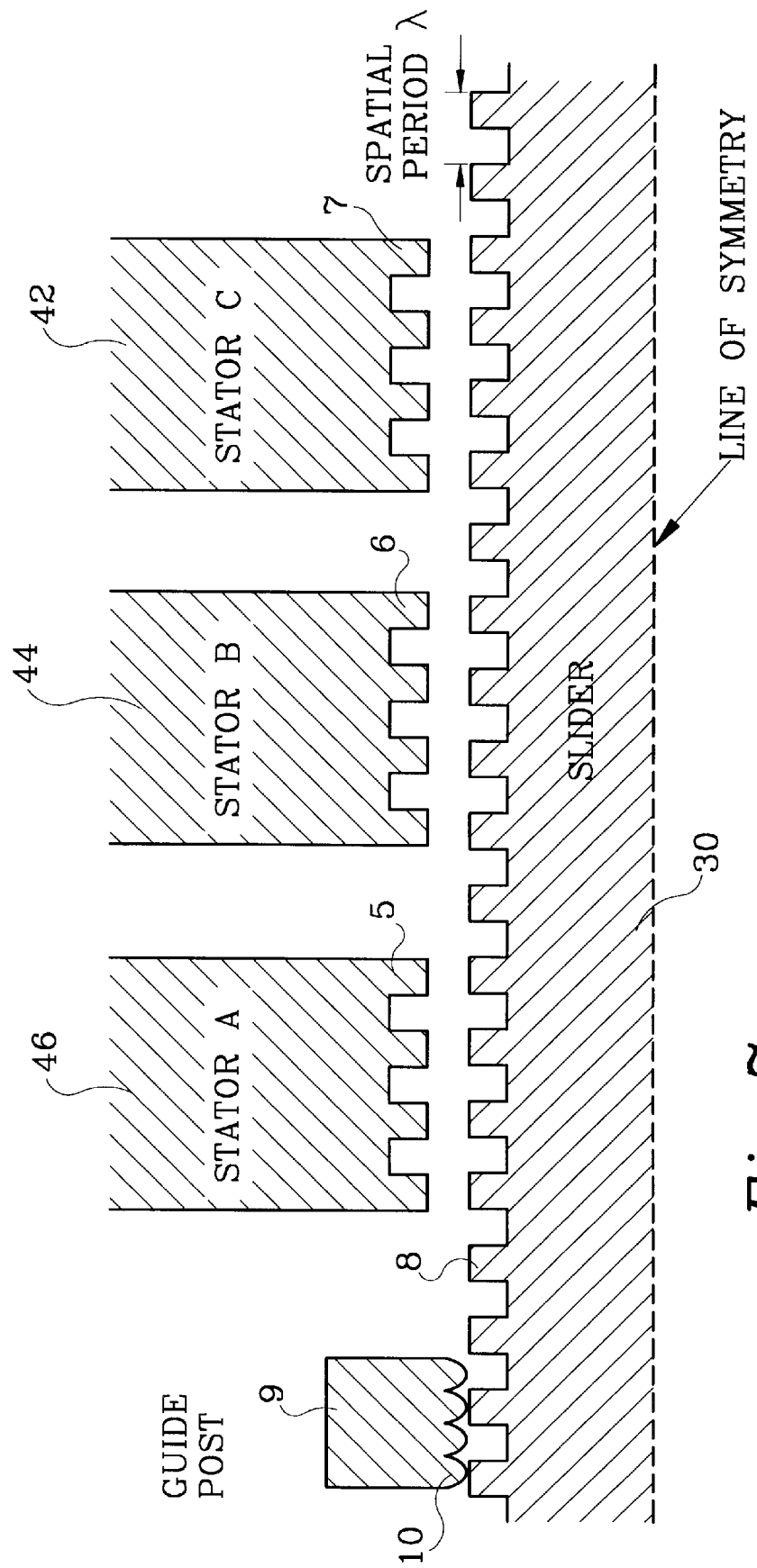
FIG. 7 illustrates the operation of the three phase stepping motor.
Figure 8:
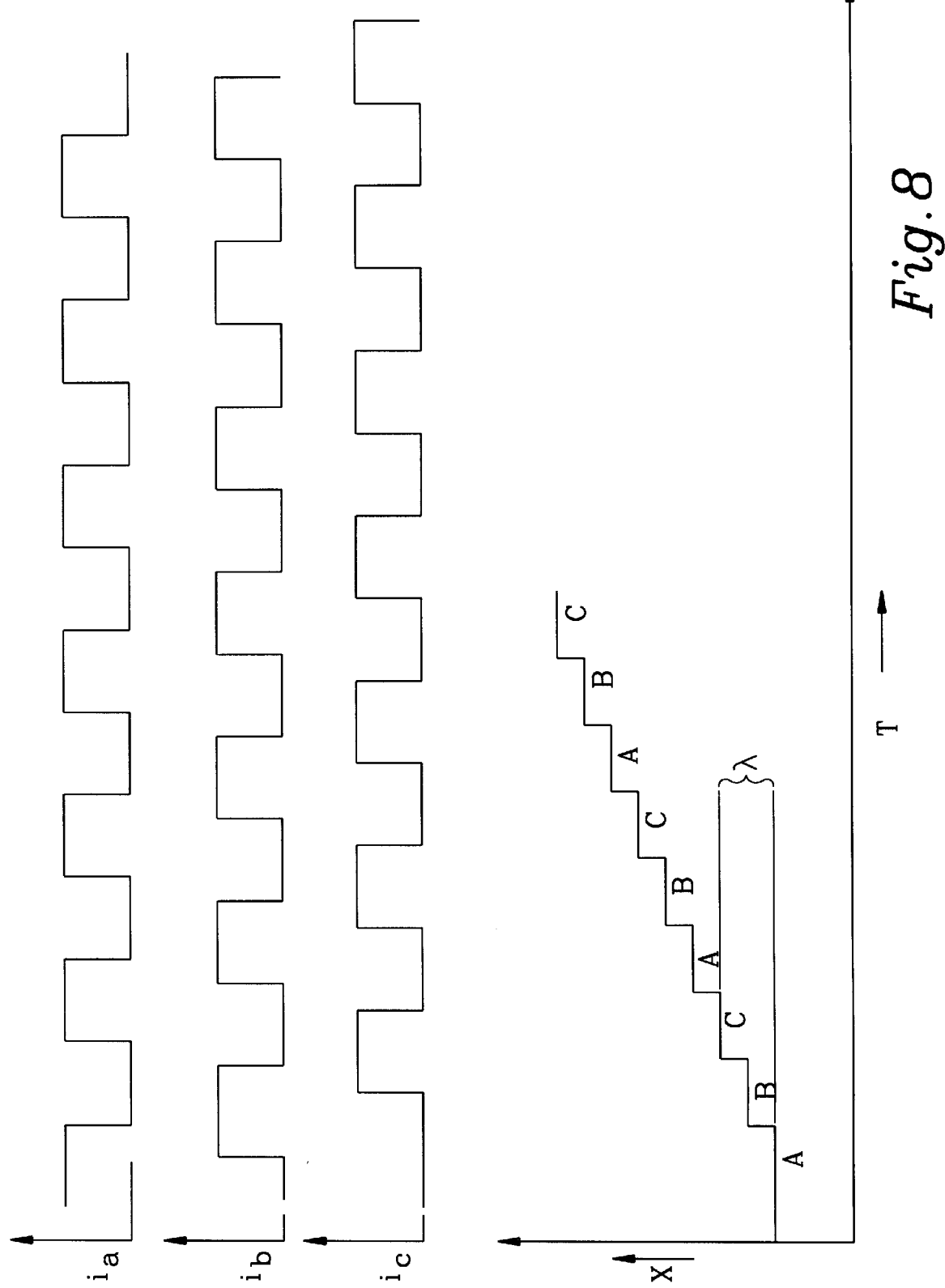
FIG. 8 illustrates a timing diagram for the three phase stepping motor.

FIG. 7 illustrates the operation of the three phase motor, while FIG. 8 illustrates the drive current for each of the stators corresponding to the position of the slider as the slider is stepped through its motion. The three phase motor comprises three stators 42, 44 and 46 and a slider or plunger 30 which moves left or right depending on the sequencing of the energizing of the stators. Slider 30 is provided with teeth 8 having a spatial period $\lambda$. The stators 42, 44, and 46 are staggered with respect to the teeth on slider 30. The stagger between stator 46 and stator 44 is ⅓ $\lambda$, a third of the period, as is the staggering between stators 44 and 42. With stator 46 energized and its teeth 5 aligned with those of slider 30, as shown in FIG. 7, energizing of stator 44 will pull the slider to the right until teeth 8 are midway between alignment with teeth 5 and 6. Then stator 46 is de-energized and the slider teeth align with stator teeth 6, displacing the slider a total distance of ⅓ $\lambda$ to the right. The process is repeated with the pair of stators 44 and 42 and then repeated again with stator pairs 42 and 46, resulting in total displacement of 1 period, $\lambda$. FIG. 8 illustrates energizing of the stators as a positive current. The current for stator 46 is shown as current $i_a$. The current for stator 44 is shown as current current $i_b$. The current for stator 42 is shown as current $i_c$. The timing diagram for FIG. 8 is completed by the position versus time corresponding to waveforms 11 through 13, in line 14. As is apparent from the figure each sequential energizing of a stator moves slider 30 ⅓ $\lambda$. For the purpose of simplicity ⅓ steps have been illustrated. However, by tuning the force supplied by the stators it is possible to decrease the steps to ⅙ $\lambda$.

It was mentioned earlier that the stepper motor can in principle have unlimited travel as it can continue to drive the beam by repeating the sequencing of the motor. This is not true in practice as the drive beam must still be supported by some means. In the case of the tunable filters, the beam is constrained by the folded beam support spring structure 40 and 41 and the load of the IR filters 21. In order to further increase the travel and size of such devices, the length of the straight beam springs 40 and 41 must get proportionately longer. The filter of FIG. 2 has been designed for a range of travel of ±390 $\mu$m and a tunable range of the wavelength cutoff from 8 to 32 $\mu$m for each of the filters.

The filter of FIG. 3 shows a different approach to the filter design that lends itself to scaling both the filter size and tunable range of the filter. The design of the folded beam support springs 40 and 41, allows the support springs to move, expanding or compressing along with the filter 21 and a rigid outside frame 50, allows relatively easy handling and assembly of the structure. The overall size of the structure is 6 mm×1.2 cm. The filter area of this structure is 3.5 mm×2.5 mm and could be scaled even larger. It is designed for a travel range of ±1.08 mm. This filter design is also intended to be the first step in extending the working range of the filter cutoff to lower wavelengths. The filter portion of this structure is intended to be the support structure for a second level filter with a much finer structure.

Figure 9:
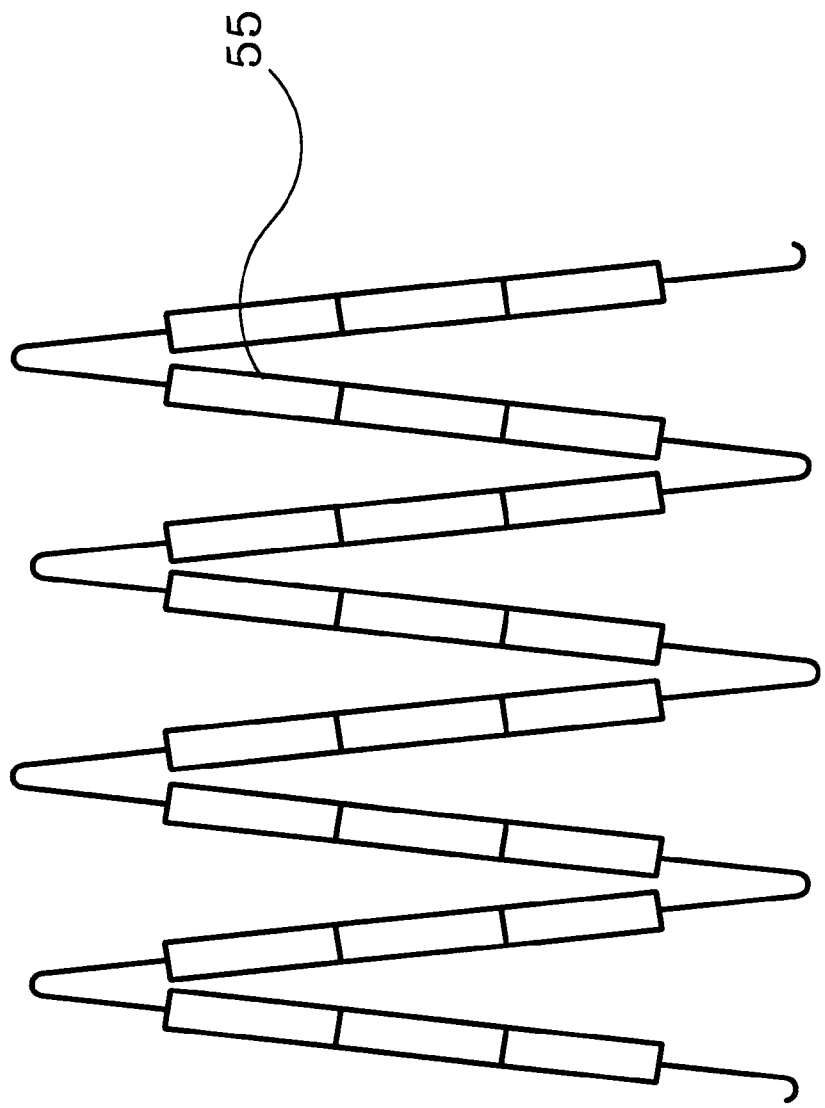
FIG. 9 illustrate a truss structure for flexure springs.

As the overall length of the movable structure is relatively large, a truss structure was added to the filter and support spring structures to increase the torsional and out-of-plane rigidity, while keeping the structure compliant in the normal direction of travel. The force constant in the normal direction of travel was kept very low at 0.32 N/m. A detail of this truss structure 55 is shown in FIG. 9. The frame of the filter structure is assembled onto a mounting post on the actuator substrate.

We claim:

1. A micro-machined stepper motor comprising:
   a first set of flexures connected at a first end to a first end of a load and a second end of said first set of flexures is connected to support means;
   a toothed slider having a longitudinal axis connected at a first end to said first end of said load;
   a second set of flexures connected at a first end to a second end of said toothed slider; and
   a first, a second, and a third toothed stator spaced along said toothed slider, wherein each of said stators is energized in a predetermined sequence to move said slider along said longitudinal axis.

2. The micro-machined stepper motor of claim 1 further comprising guide post, wherein said guide posts assist in guiding said slider along its longitudinal axis.

3. The micro-machined stepper motor of claim 2 wherein said load is a tunable high pass filter.

4. The micro-machined stepper motor of claim 1 wherein said load is a tunable high pass filter.

5. The micro-machined stepper motor of claim 1 wherein said first and second sets of flexures further comprise truss structures.

6. A micro-machined stepper motor comprising:
   a toothed slider having a longitudinal axis connected at a first end to a first load; and
   a first, a second, and a third toothed stator spaced along said toothed slider, wherein each of said stators is energized in a predetermined sequence to move said slider in a bi-directional manner along said longitudinal axis.

7. The micro-machined stepper motor of claim 6 further comprising a first set of flexures connected at a first end to said first end of said first load and a second end of said first set of flexures is connected to support means.

8. The micro-machined stepper motor of claim 7 further comprising a second set of flexures connected at a first end to a second end of said load and a second end of said second set of flexures is connected to support means.

9. The micro-machined stepper motor of claim 7 further comprising guide posts, wherein said guide posts assist in guiding said slider along its longitudinal axis.

10. The micro-machined stepper motor of claim 7 wherein said flexures comprise folded beam support springs.

11. The micro-machined stepper motor of claim 8 wherein said first and second set of flexures comprise folded beam support springs.

12. The micro-machined stepper motor of claim 6 further comprising a first set of flexures connected at a first end to said first end of said slider and a second end of said first set of flexures to support means.

13. The micro-machined stepper motor of claim 12 further comprising a second set of flexures connected at a first end to a second end of said load and a second end of said first set of flexures to support means.

14. The micro-machined stepper motor of claim 13 wherein said flexures comprise folded beam support springs.

15. The micro-machined stepper motor of claim 12 wherein said flexures comprise folded beam support springs.

16. The micro-machined stepper motor of claim 6 further comprising a first set of flexures connected at a first end to a second end of said load and a second end of said first set of flexures to support means.

17. The micro-machined stepper motor of claim 16 wherein said flexures comprise folded beam support springs.

18. The micro-machined stepper motor of claim 6 further comprising a first set of flexures connected at a first end to a second end of said slider and a second end of said first set of flexures to support means.

19. The micro-machined stepper motor of claim 18 wherein said flexures comprise folded beam support springs.

20. The micro-machined stepper motor of claim 7, 12, 16, 18, 8, or 13 wherein said flexures further comprise truss structures.

21. The micro-machined stepper motor of claim 6 further comprising a second load connected at a first end to a second end of said of said slider.

22. The micro-machined stepper motor of claim 21 further comprising:
   a first set of flexures connected at a first end to said first end of said first load and
   a second end of said first set of flexures is connected to support means; and
   a second set of flexures connected at a first end to said first end of said second load and a second end of said second set of flexures is connected to support means.

23. The micro-machined stepper motor of claim 22 wherein said flexures comprise folded beam support springs.

24. The micro-machined stepper motor of claim 22 wherein said flexures further comprise truss structures.

25. The micro-machined stepper motor of claim 21 wherein said first and said second loads are tunable highpass filters.

26. The micro-machined stepper motor of claim 25 further comprising:
   a first set of flexures connected at a first end to said first end of said first load and
   a second end of said first set of flexures is connected to support means; and
   a second set of flexures connected at a first end to said first end of said second load and a second end of said second set of flexures is connected to support means.

27. The micro-machined stepper motor of claim 26 wherein said flexures further comprise truss structures.

28. The micro-machined stepper motor of claim 26 further comprising guide posts, wherein said guide posts assist in guiding said slider along its longitudinal axis.

29. The micro-machined stepper motor of claim 28 wherein said loads further comprise flexures.

30. The micro-machined stepper motor of claim 29 wherein said slider comprises an electromagnetic material.

31. The micro-machined stepper motor of claim 30 wherein said stepper motor is manufactured utilizing the LIGA process.

32. The micro-machined stepper motor of claim 6 wherein said load is a tunable highpass filter.

33. The micro-machined stepper motor of claim 6 further comprising guide posts, wherein said guide posts assist in guiding said slider along its longitudinal axis.

34. A micro-machined electromagnetic stepper motor comprising:
   a toothed slider having a longitudinal axis connected at a first end to a first load, said toothed slider being formed of a material which is sensitive to electromagnetic fields; and
   a first, a second, and a third toothed stator spaced along said toothed slider, wherein each of said stators is energized to produce an electromagnetic field in a predetermined sequence to move said slider along said longitudinal axis.

35. The micro-machined stepper motor of claim 34 further comprising a first set of flexures connected at a first end to said first end of said first load and a second end of said first set of flexures is connected to support means.

36. The micro-machined stepper motor of claim 35 further comprising a second set of flexures connected at a first end to a second end of said load and a second end of said first set of flexures to support means.

37. The micro-machined stepper motor of claim 36 wherein said first and second set of flexures comprise folded beam support springs.

38. The micro-machined stepper motor of claim 35 further comprising guide posts, wherein said guide posts assist in guiding said slider along its longitudinal axis.

39. The micro-machined stepper motor of claim 35 wherein said flexures comprise folded beam support springs.

40. The micro-machined stepper motor of claim 34 further comprising a first set of flexures connected at a first end to said first end of said slider and a second end of said first set of flexures to support means.

41. The micro-machined stepper motor of claim 40 further comprising a second set of flexures connected at a first end to a second end of said load and a second end of said first set of flexures to support means.

42. The micro-machined stepper motor of claim 41 wherein said flexures comprise folded beam support springs.

43. The micro-machined stepper motor of claim 40 wherein said flexures comprise folded beam support springs.

44. The micro-machined stepper motor of claim 34 further comprising a first set of flexures connected at a first end to a second end of said load and a second end of said first set of flexures to support means.

45. The micro-machined stepper motor of claim 44 wherein said flexures comprise folded beam support springs.

46. The micro-machined stepper motor of claim 34 further comprising a first set of flexures connected at a first end to a second end of said slider and a second end of said first set of flexures to support means.

47. The micro-machined stepper motor of claim 46 wherein said flexures comprise folded beam support springs.

48. The micro-machined stepper motor of claim 34 further comprising a second load connected at a first end to a second end of said of said slider.

49. The micro-machined stepper motor of claim 48 further comprising:

a first set of flexures connected at a first end to said first end of said first load and a second end of said first set of flexures is connected to support means; and a second set of flexures connected at a first end to said first end of said second load and a second end of said second set of flexures is connected to support means.

50. The micro-machined stepper motor of claim 49 wherein said flexures comprise folded beam support springs.

51. The micro-machined stepper motor of claim 48 wherein said first and said second loads are tunable highpass filters.

52. The micro-machined stepper motor of claim 51 further comprising:

a first set of flexures connected at a first end to said first end of said first load and a second end of said first set of flexures is connected to support means; and a second set of flexures connected at a first end to said first end of said second load and a second end of said second set of flexures is connected to support.

53. The micro-machined stepper motor of claim 34 wherein said load is a tunable highpass filter.

54. The micro-machined stepper motor of claim 34 further comprising guide posts, wherein said guide posts assist in guiding said slider along its longitudinal axis.

* * * * *

UNITED STATES PATENT AND TRADEMARK OFFICE
CERTIFICATE OF CORRECTION

PATENT NO.: 5,929,542      Page 1 of 4
DATED: Jul. 27, 1999
INVENTOR(S): Ohnstein et al.

It is certified that error appears in the above-identified patent and that said Letters Patent is hereby corrected as shown below:

Please substitute for Figure 2 the corrected figure below:

2/10

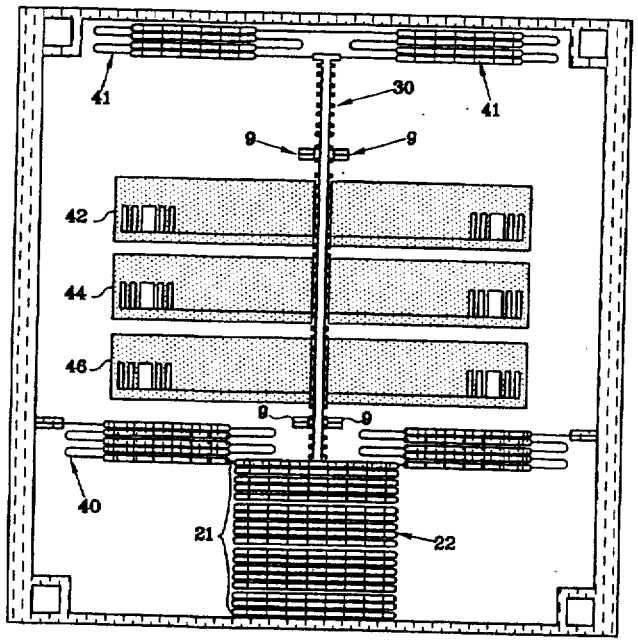

Fig.2

UNITED STATES PATENT AND TRADEMARK OFFICE
CERTIFICATE OF CORRECTION

PATENT NO.: 5,929,542

DATED: Jul. 27, 1999

INVENTOR(S) : Ohnstein et al.

It is certified that error appears in the above-identified patent and that said Letters Patent is hereby corrected as shown below:

Please substitute for Figure 4 the corrected figure below:

4/10

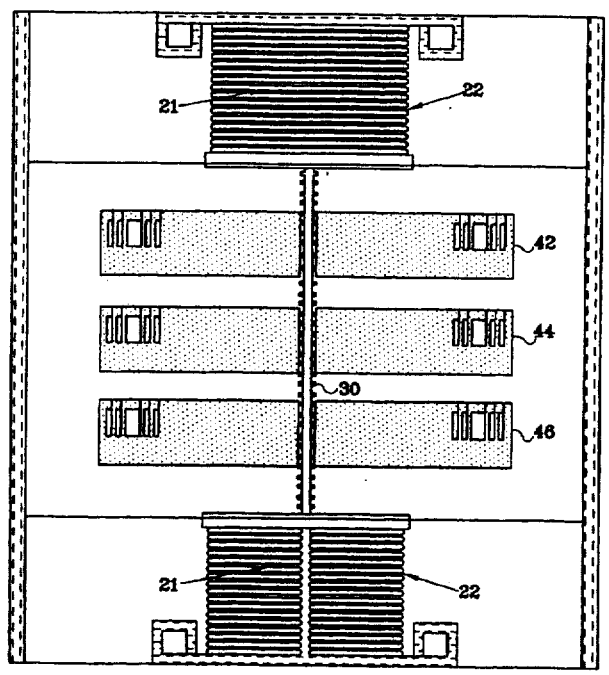

*Fig. 4*

UNITED STATES PATENT AND TRADEMARK OFFICE
CERTIFICATE OF CORRECTION

PATENT NO.: 5,929,542

Page 3 of 4

DATED: Jul. 27, 1999

INVENTOR(S) : Ohnstein et al.

It is certified that error appears in the above-identified patent and that said Letters Patent is hereby corrected as shown below:

Please substitute for Figure 7 the corrected figure below:

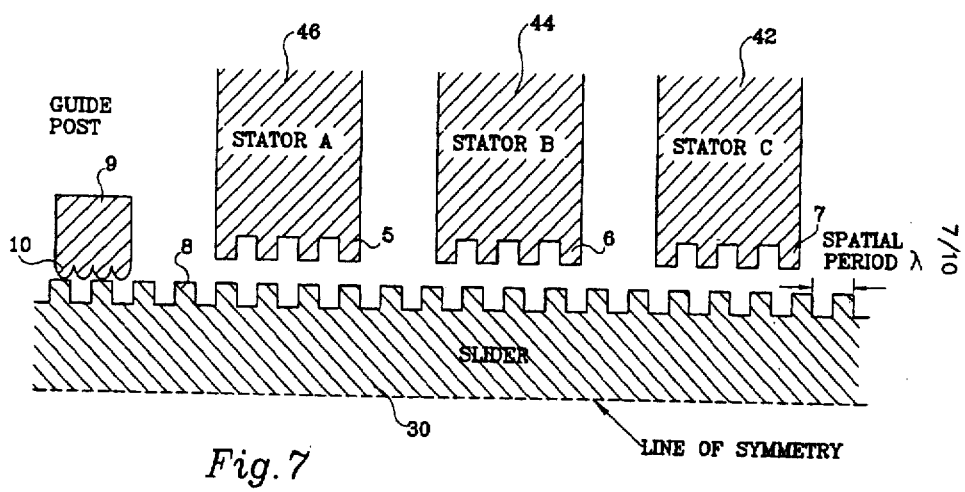

Fig. 7

UNITED STATES PATENT AND TRADEMARK OFFICE
CERTIFICATE OF CORRECTION

PATENT NO.: 5,929,542

DATED: Jul. 27, 1999

INVENTOR(S): Ohnstein et al.

It is certified that error appears in the above-identified patent and that said Letters Patent is hereby corrected as shown below:

Please substitute for Figure 10 the corrected figure below:

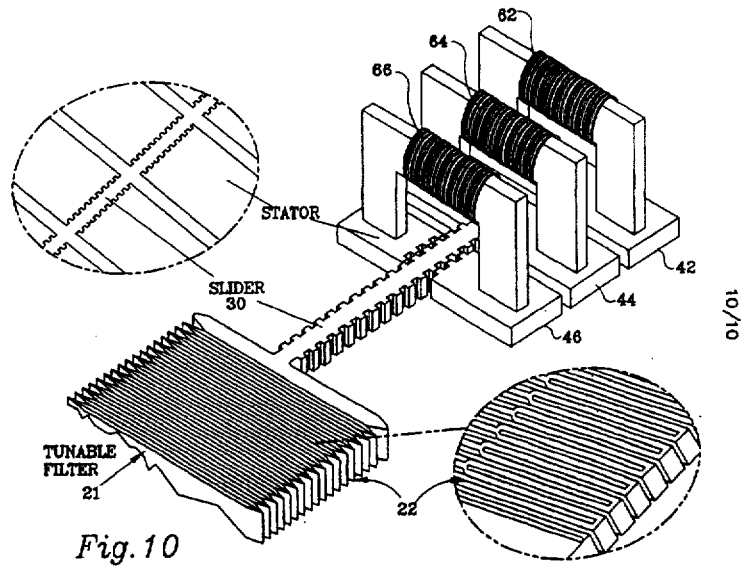

Fig. 10

Signed and Sealed this

Twenty-second Day of May, 2001

Attest:

NICHOLAS P. GODICI

Attesting Officer

Acting Director of the United States Patent and Trademark Office